June 4, 1963  W. D. WHALEN  3,091,985
FLUID OPERATED REST AND VIBRATION DAMPER FOR TURNING MACHINE
Filed June 24, 1959  2 Sheets-Sheet 1

INVENTOR.
WILLIAM D. WHALEN
BY Toulmin & Toulmin
ATTORNEYS

June 4, 1963  W. D. WHALEN  3,091,985
FLUID OPERATED REST AND VIBRATION DAMPER FOR TURNING MACHINE
Filed June 24, 1959  2 Sheets-Sheet 2
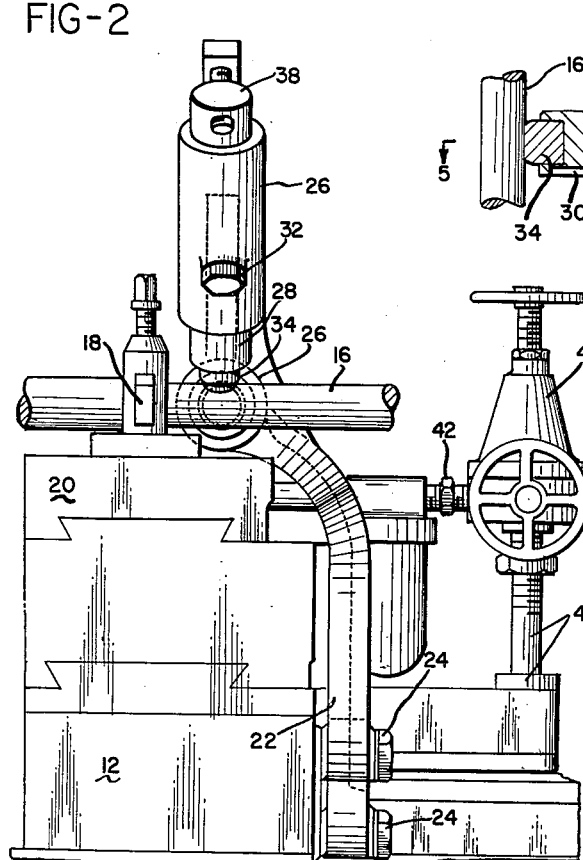
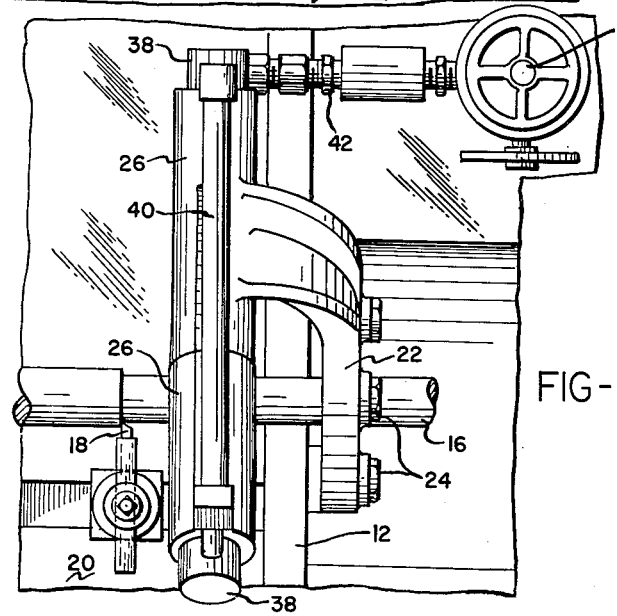
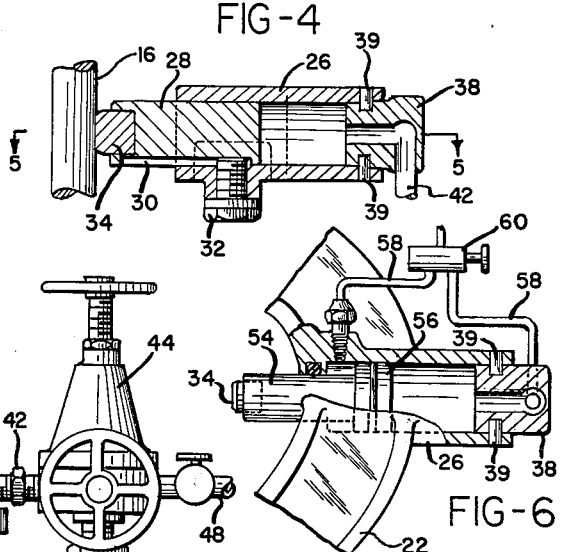
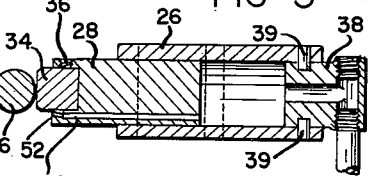
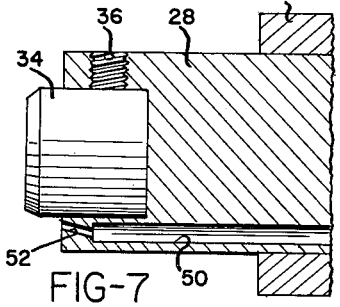
INVENTOR.
WILLIAM D. WHALEN
BY
ATTORNEYS

United States Patent Office 3,091,985
Patented June 4, 1963

3,091,985
FLUID OPERATED REST AND VIBRATION DAMPER FOR TURNING MACHINE
William D. Whalen, Cincinnati, Ohio, assignor to The R. K. Le Blond Machine Tool Company, Cincinnati, Ohio, a corporation of Delaware
Filed June 24, 1959, Ser. No. 822,485
3 Claims. (Cl. 82—38)

This invention relates to rests for turning machines, especially for lathes, and more particularly relates to a combination follow rest and vibration damper for a lathe.

Steady rests and follow rests are well known in the machine tool art and comprise means for engaging and supporting a workpiece while it is being turned.

The steady rest is generally a stationary support of this nature while a follow rest follows the cutting tool and supports the work adjacent the cutting tool. It is in particular connection with follow rests that the present invention is concerned but it will be evident that stationarily mounted steady rests could advantageously be constructed according to this invention.

A follow rest or steady rest employs adjustable members which are brought into engagement with the surface of the work being turned and which are locked in position to provide solid support for the work. After a turning operation, the support members are then retracted from the finished work and are readjusted into position when a new piece is to be turned.

According to the present invention the support members are actuated at least into their workpiece supporting position by fluid pressure which may comprise either a pneumatic or hydraulic medium, rather than by being moved manually into supporting position and locked in place.

The compressed gas or fluid for actuating the supporting members has, by its very nature, a very low natural frequency of vibration. This frequency is much lower than the natural frequency of the lathe or of the workpiece or cutting tool so that there is substantially no possibility of the supporting members ever approaching a condition of resonance with any of the machine, workpiece, or tool. Further, the gas or fluid actuation of the supporting members into engagement with the workpiece eliminates rigid connection between the workpiece and the machine so that any tendency of the workpiece to vibrate is not transmitted to the machine which might establish a resonance condition which is most undesirable.

Having the foregoing in mind, the present invention has for its primary object the provision of a steady rest or follow rest arrangement in which the supporting members are moved into supporting position by fluid rather than being manually adjusted into the said supporting position and locked in place.

Another object of this invention is the provision of an arrangement for actuating the workpiece engaging members of a steady rest or follow rest so that uniform supporting conditions are had throughout the turning operation.

A still further object of this invention is the provision of a follow rest arrangement in which the surface of the work being supported is maintained clean at all times so that there will be no chips or the like to interfere with the supporting action, nor mar or scratch the work surface.

A still further object of the present invention is the provision of a rest structure for workpieces that are being turned which has a tendency to damp out vibrations and chattering of the work as it is being turned.

It is also an object of this invention to provide a combination steady rest and damper for workpieces being turned in which the damping action can be varied readily.

These and other objects and advantages will become more apparent upon reference to the drawings in which:

FIGURE 2 is a more or less diagrammatic view looking in at the follow rest structure from the cutting tool side thereof;

FIGURE 3 is a plan view looking down on top of the follow rest structure;

FIGURE 4 is a sectional view indicated by line 4—4 on FIGURE 1;

FIGURE 5 is a sectional view indicated by line 5—5 on FIGURE 4;

FIGURE 6 is a fragmentary view showing modified arrangement; and

FIGURE 7 is a view drawn at somewhat enlarged scale showing the manner in which the supporting members can have buttons detachably mounted therein which may be wear resistant or which may be of a material which will prevent scratching of the workpiece surface.

Figure 1:
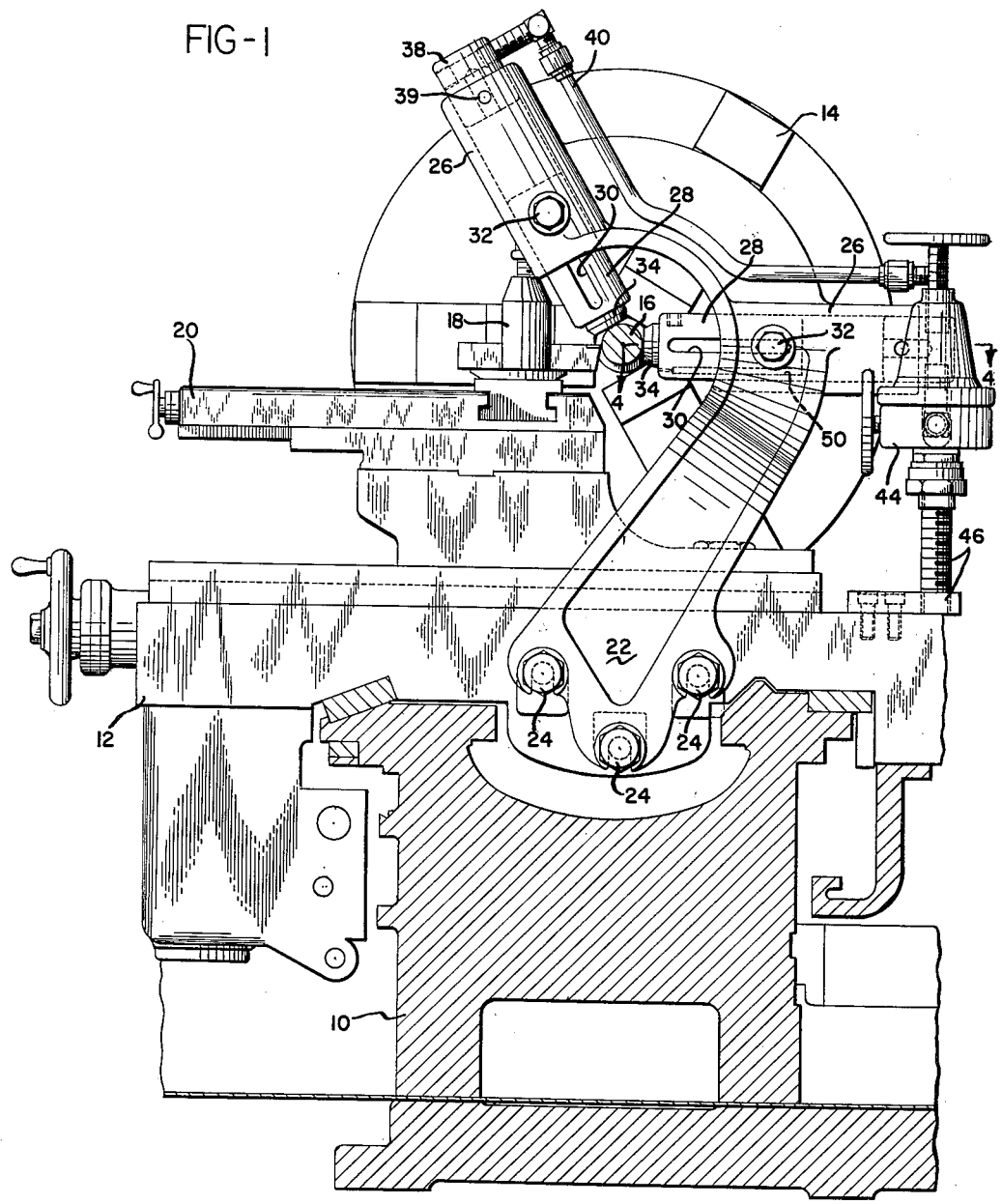
FIGURE 1 is a cross section rather diagrammatically drawn through a lathe showing a follow rest according to the present invention mounted on the carriage.

Referring to the drawings somewhat more in detail, in FIGURE 1 the machine illustrated comprises a bed 10 on which is slidably mounted a carriage 12. Means are provided such as head stock 14 for providing a workpiece axis on which is mounted a workpiece 16 that is to be turned by tool 18 mounted on tool slide 20 mounted on the carriage.

According to this invention there is also mounted on the carriage a bracket 22 as by cap screws 24 which extends upwardly and arcuately about the work axis.

Bracket 22, as will be seen in FIGURES 2 and 3 also extends inwardly toward the tool slide so that the supporting members of the follow rest engage the workpiece adjacent the cutting tool.

The bracket 22 is provided with bored cylindrical portions 26 which are disposed, one substantially opposite the cutting tool 18, and the other above the workpiece and inclined toward the cutting tool side of the workpiece. In each of the cylindrical portions there is a cylindrical plunger 28, each of which includes a keyway 30 into which extends the end of a clamping screw 32 which is normally retracted from clamping position so that the members 28 are freely slidable in the cylindrical portions 26.

As will be seen in FIGURE 7 each member 28 has mounted in its workpiece end a button or plug 34 held in place by a set screw 36. This button while it may be of a hard wear resistant material is more likely to be of a material which will not scratch or mar the workpiece surface. Such materials may comprise Teflon, nylon, Bakelite or other materials of that nature. The uniform fluid pressure acting on the support members will automatically compensate for any wear of buttons of this nature.

The cylindrical portions 26 have their cutter ends closed by the plugs or collars 38 which are closely fitted into the bores in the cylindrical members and retained therein as by pins 39. Each collar 38 is provided with passage means leading to the bore in its pertaining cylindrical portion 26.

The passage means in the collars are interconnected by tubing means 40 and the passage means in one of the collars is further connected by tubing 42 with the outlet side of a pressure regulator 44 that is mounted on the carriage for movement therewith as by the support 46 and which is supplied with air to its inlet by flexible tubing that may be connected with inlet pipe 48.

The arrangement is such that a supply of air through the pressure regulator to tubes 42 and 40 will urge the members 28 inwardly toward the workpiece to bring the buttons 34 into engagement with the workpiece so as to exert a predetermined force thereon that will support the workpiece while it is being turned. The support members are so located that the resultant force thereof against the workpiece is substantially directly opposed to the force exerted on the workpiece by the turning tool thus providing for extremely stable operating conditions.

A further feature of the present invention is to be found in the drilled passage 50 provided in at least the lower one of the members 28 which terminates in a jet or nozzle 52 which is directed toward the workpiece so that the workpiece is blown clean of chips or other foreign matter thus preventing any interference thereby with the action of the follow rest arrangement or marring of the workpiece surface.

After the workpiece has been turned, the air pressure can be cut off and the members 28 retracted and then clamped in retracted position by the clamp screws 32 until another turning operation is to be carried out.

The present invention also, however, contemplates moving the support members in both directions by fluid pressure and this could be accomplished by an arrangement such as illustrated in FIGURE 6 wherein the support members 54 have piston heads 56 thereon located in the bores of the cylindrical portions 26 of bracket 22 and with there being a tube 58 leading to each end of the said bore. A manual valve 60 is provided which is operable for reversing the supply of air under pressure to the tubes 58 whereby the supporting member is actuated in both directions by fluid pressure. This arrangement utilizing a single valve could be extended to two or more of the support members in the same manner as the first described modification merely by constructing all of the support members as illustrated in FIGURE 6 and extending the tubes 58 to the opposite ends of the several bores in the cylindrical portions 26 pertaining thereto.

By the present invention, an arrangement is provided whereby uniform supporting of a workpiece throughout the turning thereof is provided with the surface of the workpiece being maintained clean at all times to prevent interference with the supporting action or marring of the workpiece surface. Manual adjustment of the supporting members into engagement with the workpiece is eliminated and in the FIGURE 6 modification all manual adjustments of the support members are eliminated.

The follow rest structure of the present invention is constructed and arranged for being mounted on conventional carriages and can be installed or removed readily as may be desired.

An important feature of the present invention is that the rest structure illustrated and described has vibration damping characteristics such that when a workpiece being turned tends to vibrate or chatter as a result of the cutting action of the tool, this tendency will be restrained by the cushioning effect of the compressed fluid behind the supporting members. Since the tendency of the workpiece to vibrate or chatter is a function of its length to diameter ratio, the nature of the cutting being taken, and the condition of the cutting tool, it is preferable for there to be provided a pressure regulator referred to so that the pressure behind the supporting members can be adjusted to the optimum value. This regulator is also preferably so mounted as to be convenient to the operator at all times. As illustrated, for example, the regulator is carried on the lathe carriage with the rest.

It will be understood that this invention is susceptible to modification in order to adapt it to different usages and conditions; and, accordingly, it is desired to comprehend such modifications within this invention as may fall within the scope of the appended claims.

I claim.

1. In a follow rest structure for a lathe; a bracket adapted for detachable connection with the lathe carriage and extending upwardly and partially about the work axis of the lathe and also extending longitudinally of the work axis from its point of connection with the carriage to the region of a tool on the carriage, bores in the bracket extending toward the said work axis, unitary support members reciprocable in said bores, means for supplying air under regulated pressure to the outer ends of said bores so as to urge the support members resiliently into direct supporting vibration damping engagement with a workpiece on said work axis, and at least one of said support members having passage means extending therethrough from the end of the support member opposite the workpiece to the workpiece end thereof and terminating in nozzle means directed toward the workpiece whereby a jet of air under pressure from the passage means impinges on the workpiece and maintains the workpiece surface free of chips and the like.

2. In a follow rest structure for a lathe; a bracket adapted for detachable connection with a lathe carriage at one side and extending upwardly and partially about the work axis of the lathe and also extending longitudinally of the work axis from its point of connection with the carriage to the region of a tool on the carriage, bores in the bracket extending toward the said work axis, unitary support members reciprocable in said bores, means for supplying air under regulated pressure to the outer ends of said bores so as to urge the support members resiliently into direct supporting vibration damping engagement with a workpiece on said work axis, and at least one of said support members having passage means extending therethrough from the end of the support member opposite the workpiece to the workpiece end thereof and terminating in nozzle means directed toward the workpiece whereby a jet of air under pressure from the passage means impinges against the workpiece and maintains the workpiece surface free of chips and the like, there being a pressure regulator on the carriage connected in circuit between the source of air under pressure and the said bores for regulating the pressure supplied to the said bores.

3. In a follow rest structure for a lathe, a bracket adapted for detachable connection with the carriage of the lathe, said bracket extending upwardly from the carriage and part way about the work axis of the lathe and also extending longitudinally of the lathe from its point of connection to the carriage to the region of a tool on the carriage, angularly related bores in the bracket extending toward the work axis of the lathe, pistons in said bores, rod portions rigid with the pistons extending from the pistons out the ends of the bores toward the work axis forming support members for direct supporting vibration damping engagement with a workpiece on the work axis, and means for reversibly supplying air under pressure to the opposite ends of said bores for moving the support members toward and away from said work axis, at least one of said pistons and rods being provided with a passage means from end to end terminating in a nozzle means operable for directing a supply of fluid under pressure against the surface of the workpiece when the support members are urged by said air into engagement with the workpiece thereby to maintain the workpiece surface free of chips.

References Cited in the file of this patent

UNITED STATES PATENTS

| | | |
|---|---|---|
| 1,885,233 | Cole | Nov. 1, 1932 |
| 1,961,091 | Smith et al. | May 29, 1934 |
| 2,298,082 | Flocter | Oct. 6, 1942 |
| 2,655,828 | Hazen | Oct. 20, 1953 |
| 2,713,282 | Burgsmuller | July 19, 1955 |
| 2,730,845 | Ernst | Jan. 17, 1956 |

FOREIGN PATENTS

| | | |
|---|---|---|
| 1,112,442 | France | Nov. 16, 1955 |